(12) United States Patent
Koertner et al.

(10) Patent No.: US 8,241,690 B2
(45) Date of Patent: *Aug. 14, 2012

(54) METHOD OF MAKING FRESH CHEESE WITH ENHANCED MICROBIOLOGICAL SAFETY

(75) Inventors: Mary Regina Koertner, Barrington, IL (US); Vickie Jane Lewandowski, Grayslake, IL (US); David Webb Mehnert, Lake Villa, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 281 days.

This patent is subject to a terminal disclaimer.

(21) Appl. No.: 12/618,195

(22) Filed: Nov. 13, 2009

(65) Prior Publication Data

US 2011/0117241 A1 May 19, 2011

Related U.S. Application Data

(60) Provisional application No. 61/114,633, filed on Nov. 14, 2008.

(51) Int. Cl.
*A23C 19/00* (2006.01)
(52) U.S. Cl. .............. 426/582; 426/34; 426/36; 426/39; 426/532; 426/654
(58) Field of Classification Search .............. 426/34, 426/36, 38, 39, 40, 41, 42, 43, 52, 531, 532, 426/580, 582, 654
See application file for complete search history.

(56) References Cited

U.S. PATENT DOCUMENTS

| | | | |
|---|---|---|---|
| 2,744,827 A | 5/1956 | Mattick et al. | |
| 4,584,199 A | 4/1986 | Taylor | |
| 4,597,972 A | 7/1986 | Taylor | |
| 5,015,487 A | 5/1991 | Collison et al. | |
| 5,232,849 A | 8/1993 | Vedamuthu et al. | |
| 5,527,505 A | 6/1996 | Yamauchi et al. | |
| 5,716,811 A | 2/1998 | Nauth et al. | |
| 6,110,509 A | 8/2000 | Nauth et al. | |
| 6,113,954 A | 9/2000 | Nauth et al. | |
| 6,120,809 A | 9/2000 | Rhodes | |
| 6,136,351 A | 10/2000 | Nauth et al. | |
| 6,242,017 B1 | 6/2001 | Nauth et al. | |
| 6,613,364 B2 | 9/2003 | Begg et al. | |
| 6,780,445 B1 | 8/2004 | Rhodes | |
| 7,323,204 B2 * | 1/2008 | Zheng et al. | 426/582 |
| 7,858,137 B2 * | 12/2010 | Zheng et al. | 426/582 |
| 2002/0150660 A1 | 10/2002 | Pasch et al. | |
| 2004/0175473 A1 | 9/2004 | Nauth et al. | |
| 2004/0258798 A1 | 12/2004 | Rhodes | |
| 2005/0287272 A1 | 12/2005 | Zheng et al. | |
| 2008/0152757 A1 | 6/2008 | Zheng et al. | |

FOREIGN PATENT DOCUMENTS

| | | |
|---|---|---|
| AU | 2007211949 A1 | 7/2008 |
| CA | 2452383 A1 | 1/2003 |
| EP | 0466244 A1 | 1/1992 |
| EP | 0983724 A1 | 3/2000 |
| EP | 1230861 A2 | 8/2002 |
| EP | 1609369 A1 | 12/2005 |
| EP | 1743647 A1 | 1/2007 |
| WO | WO 9921430 | 5/1999 |
| WO | WO03053158 A2 | 7/2003 |

OTHER PUBLICATIONS

Desjardins et al., Effect of aeration and dilution rate on nisin Z production during continuous fermentation with free and immobilized Lactococcus lactis UL719 in supplemented whey permeate, International Dairy Journal 11 (2001) 943-951.

Delves-Broughton, J. Nisin and its Uses as a Food Preservative, Food Technology, Nov. 1, 1990, at 100.

* cited by examiner

*Primary Examiner* — Leslie Wong
(74) *Attorney, Agent, or Firm* — Fitch, Even, Tabin & Flannery, LLP

(57) ABSTRACT

Described herein is a high moisture, preserved cheese product having enhanced microbial food safety and methods of making the high moisture, preserved cheese product. Enhanced microbial food safety is achieved by using a combination of organic food preserving acids, a nisin component and an enzyme.

14 Claims, No Drawings

METHOD OF MAKING FRESH CHEESE WITH ENHANCED MICROBIOLOGICAL SAFETY

RELATED APPLICATIONS

This application claims priority to U.S. Provisional Application No. 61/114,633, filed Nov. 14, 2008, the contents of which are hereby incorporated by reference.

FIELD

Described herein is a high moisture, preserved cheese product having enhanced microbial food safety and methods of making the high moisture, preserved cheese product. Enhanced microbial food safety is achieved by using a combination of organic food preserving acids, a nisin component and an enzyme system.

BACKGROUND

Food processors have long felt the need for methods to prolong the shelf life of foodstuffs and/or increase microbiological stability of such foodstuffs. By increasing the amount of time a foodstuff is stable, processors can mitigate inventory losses due to spoiled foodstuffs. Prior methods, such as, the use of packaging, preservatives, and/or specific storage parameters (e.g., refrigeration) have been used to stave off spoilage.

Bacterial contamination of foods is known to be responsible for spoilage and for the transmission of food borne illness. In particular, *Listeria monocytogenes* has been associated with such foods as raw milk, cheeses (particularly soft-ripened varieties), ice cream, raw vegetables, fermented raw meat sausages, raw and cooked poultry, raw meats (of all types), and raw and smoked fish. *Listeria monocytogenes* is a psychrotrophic food borne pathogen which is very widespread in the environment and in foods. The ability of *Listeria monocytogenes* to grow at temperatures as low as 3° C. permits multiplication in refrigerated foods.

Bacteriocins are antimicrobial peptides that are produced by bacteria and which have bactericidal action against closely related species. One of the most extensively characterized bacteriocin is nisin which is produced by a lactic acid type bacteria and which may be used to prevent growth of Gram-positive bacteria in a wide variety of different food products, particularly dairy products (see, e.g., U.S. Patent Publication No. 2008/0152757; U.S. Pat. Nos. 2,744,827; 4,584,199; 4,597,972; and 5,527,505).

Currently, most commercial refrigerated unaged, high moisture cheese products with relatively high pHs (e.g. above about 5.0) have a very limited shelf life and do not have secondary barriers to psychrotrophic pathogens. However, there have been efforts to enhance the microbiological safety of such cheese products. Generally, known methods to enhance microbiological safety in food products include cooking, adjusting water activity, adjusting pH, and/or using preservatives. However, these methods are generally expensive and therefore increase the cost of storing and producing the foodstuff while, in some cases, diminishing the organoleptic properties of the food product.

SUMMARY

A high moisture preserved cheese product and a method of preserving a high moisture cheese product is described herein. The high moisture preserved cheese product comprises a high moisture cheese and a preservative blend of: (i) at least one food grade organic food preserving acid or its food grade acceptable water soluble salt which can include citric acid and water soluble salts thereof and/or sorbic acid and water soluble salts thereof, (ii) a nisin component, (iii) and an enzyme system which is active against gram positive and gram negative bacteria as well as yeast and molds, and remains active to inhibit such bacterial in a pH range of 3.6 to 8.3. The preservative blend of organic preserving acid, nisin component and enzyme system is in an amount and the ingredients of such blend are in relative amounts to provide a high moisture preserved cheese product with less than 1 log cfu/g of pathogenic gram positive and gram negative bacteria for at least about 7 days when stored immediately after its production at 55° F., and preferably 45° F. In another aspect, the preserved cheese product is aseptically packaged immediately or nearly immediately after its production and the aseptically packaged preserved cheese product will have less than 1 log cfu/g for at least 7 days if the aseptic package is opened just after packaging and stored at 55° F., preferably 45° F. The preserved cheese product exhibits organoleptic properties similar to the same non-preserved cheese for at least 7 days after its production and storage which is open to the atmosphere and is at 55° F., preferably 45° F. The animal and fungal enzyme is commercially available as a blend under the name of Sea-i® from BIENCA S.A, Avenue Reine Astrid 262, Seneffe 7180, Belgium. The method for preserving the high moisture cheese product, includes mixing the preservative blend of the at least one organic food preserving acid which can include citric acid and/or sorbic acid, a nisin component, an enzyme system into curd which is a precursor to the high moisture cheese product. As with the preserved cheese product aspect of the invention, in the method described herein, the preservative blend of organic preserving acid, nisin component and enzyme system is in an amount and the ingredients are in relative amounts effective to provide the high moisture preserved cheese product with less than 1 log cfu/g of pathogenic gram positive and gram negative bacteria when stored for at least about 7 days at 55° F., and preferably 45° F., with the preserved cheese product exhibiting organoleptic properties similar to the same high moisture cheeses. As described herein a "high moisture cheese product" has a moisture content of at least about 40 weight percent water. Additionally, aseptically packaged means packaged to the exclusion of microorganisms other than those carried by the packaged product, such as the preserved cheese product.

In one important aspect the food preserving acid is a blend of citric acid and sorbic acid. In an important aspect the blend of citric and sorbic acid is combined with the enzymes and nisin component such that the blend has 500 parts by weight, based upon the weight of the blend, sorbic acid, 900 parts by weight, based upon the weight of the blend, citric acid, 210 parts by weight, based upon the weight of the blend, nisin, 12 parts by weight, based upon the weight of the blend, enzyme system.

In yet another important aspect, sorbic acid or its water soluble salt comprises about 0.1 weight percent, based upon the dry solids of a fresh cheese curd which is a precursor of the fresh cheese, citric acid or its water soluble salt comprises 0.18 weight percent, based upon dry solids of the cheese curd, nisin comprises about 0.0042 weight percent, based upon dry solids of the cheese curd, enzyme system comprises 0.00024 weight percent, based upon the dry solids of the cheese curd.

DETAILED DESCRIPTION

The high moisture preserved cheese product described herein has and enhanced microbial food safety such that the combination of an organic acid, nisin and enzyme system provide a preserved cheese product that retains the taste and organoleptic properties of the same cheese that does not have the combination of acid, nisin and enzyme system, but will provide a product with less gram positive and gram negative bacteria as described herein than the same cheese preserved with the same weight percents of food preservative acids, nisin and where weight percent of the enzyme system is replaced by sorbic (e.g. replacing enzyme system) and citric acid (replacing enzyme system).

The method described herein may be used in the production of any high moisture, cultured dairy product, such as, but not limited to, fresh Mexican cheeses, such as queso fresco, mozzarella cheese, ricotta cheese and cottage cheese. The cheeses produced by the methods described herein advantageously enjoy microbiological safety after removal of the preserved cheese from its packaging, rendering the cheeses more microbiologically stable over a longer period of time.

Queso fresco or queso blanco is a creamy, soft, and mild unaged white cheese. The name queso blanco is Spanish for "white cheese", but similar cheeses are used and known throughout the world by different names. Queso blanco is a fresh and slightly salty cow's milk cheese (which salts can include $CaCl_2$, whereas queso fresco may be made from a combination of cow's and goat's milk. Both of these cheeses will be referred to herein as queso fresco cheese.

Queso fresco cheese is made by pressing the whey from rennet coagulated cheese curd. Queso fresco generally has a high water activity of over 0.89 and a high pH ranging from about 5.25 to over 6.0. A typical queso fresco cheese has a good melt restriction. That is, when the cheese is exposed to moderate heat treatment such as boiling or microwave for a short period of time, it should remain in good shape and not melted unlike most other cheese products. Queso fresco, like other high moisture, fresh cheeses, if contaminated, will support growth of microbial contaminants in a matter of days without the addition of preservatives. Specifically, because of its relatively high pH, queso fresco is susceptible to the growth of bacterial pathogens such as Gram-positive bacteria, including *Listeria monocytogenes* and *Clostridium botulinum* as well as Gram-negative bacteria such as *Escherichia coli* O157:H7 and *Salmonella*. In order to be considered microbiologically stable, the cheese should not allow the inoculated pathogenic bacteria to grow more than 1 log in cfu/g in at least one month under refrigerated conditions. Most commercial queso fresco products on the market today do not meet these criteria.

Generally, the high moisture dairy products described herein retain desirable organoleptic qualities while having inhibiting bacterial growth by virtue of blend of at least one organic food preserving acid which can include citric acid and/or sorbic acid, a nisin component and an enzyme system. For example most currently commercially available queso fresco cheese products have a shelf life (not more than 1 log cfu/g) of not more than three days when stored at about 45° F., as compared to queso fresco cheese products preserved by the blend as described herein.

The bacteriocin nisin is produced by fermentation using the bacterium *Lactococcus lactis*. Commercially it is obtained from natural substrates including milk and is not chemically synthesized. It is used in processed cheese production to extend the safe, usable life by suppressing gram-positive spoilage and pathogenic bacteria. Due to its highly selective spectrum of activity it is also employed as a selective agent in microbiological media for the isolation of gram-negative bacteria, yeast and molds. Two commercially available antimicrobials containing nisin are Nisalpin® and Nova-sin™ (both from Daniso A/S, Denmark). Typically, Nisaplin contains less than about 3.0 weight % nisin, the remainder consisting of NaCl, proteins, carbohydrates and moisture. When referring to a nisin component herein the component not only includes nisin, but also other ingredients which include carriers, salts, protein and carbohydrates.

Nisin is an inhibitory polycyclic peptide with 34 amino acid residues used as a food preservative. It contains the uncommon amino acids lanthionine, methyllanthionine, dehydroalanine and dehydro-amino-butyric acid. These amino acids are synthesized by posttranslational modifications. In these reactions a ribosomally synthesized 57-mer is converted to the final peptide. The unsaturated amino acids originate from serine and threonine.

Sorbic acid is a preservative used to inhibit molds, yeast and fungi in many foods and beverages. Generally, water soluble food grade salts of sorbic acid are preferred for their water solubility.

Citric acid is a weak acid and preservative. Food grade citric acid and its water soluble salts may be used as a part of the preserved cheese product and method described herein and is recognized as a safe food additive.

Sea-i® is an enzyme system sold by BIENCA S.A., Belgium. Sea-i® has a range of activity to inhibit both Gram positive and Gram negative bacteria, in addition to yeasts and molds. Further, the enzyme system Sea-i® is activated when hydrated, with at least 20% free moisture, in the system in which it is used. Sea-i® is deactivated by heat (in excess of 50 C), pH (active in the range of 3.6 to 8.3), sanitizers (in particular oxidizing agents) or over the passage of time. Upon deactivation Sea-i® becomes protein with no catalytic activity.

Sea-i® inhibits metabolite production and has either a bacteriostatic effect (by extending the latency phase) or bactericidal effect (killing micro-organisms) depending on the initial contamination.

The blend of organic food acid, nisin and enzyme system may be added individually or premixed and blended into the cheese making process, such as blending the acids, nisin and enzyme system into the curd precursor having at least 20 weight percent moisture to the cheese product to provide a homogeneous mixture of blend and curd. In a preferred embodiment, the preservative blend is blended with the curd after the separation of the whey in order to minimize loss of the components of the preservative blend. Following the blending of the acid, nisin, enzyme system with the curd, the curd and preservative blend are mixed so that the preservative blend is homogenously dispersed throughout the curd. Generally this mixing takes from about 8 to about 10 minutes.

Advantageously, although the preserved cheese product described herein remains microbiologically stable longer after opening or exposure to microbiological contaminants, the cheese does not suffer from adverse organoleptic properties. For example, in conventional queso fresco cheese, it is desirable to prevent post-process acidification. If post-process acidification occurs, the acid produced by natural microflora during storage will result in rapid acidification of the cheese and the characteristic crumbly texture and melt restriction properties are lost and an undesirable fermented flavor will develop. By using the methods described herein, risk of post-process acidification is mitigated or eliminated by using a blend which includes citric acid, sorbic acid, nisin and an enzyme system such as Sea-i®. Thus, the methods described herein can be used to produce a preserved queso fresco cheese that may be safely stored for an extended period of time after opening without losing the typical physical and organoleptic characteristics of queso fresco cheese.

A better understanding of the present embodiment and its many advantages may be clarified with the following examples, given by way of illustration.

Comparative Example 1

Preparation of Control Queso Fresco Cheese

A queso fresco cheese without enhanced microbial stability was prepared as described hereinbelow. No antimicrobial compounds were added.

1. Add $CaCl_2$ (0.01% of 45% stock solution, diluted in deionized water) to milk in vat;

2. Slowly heat milk in vat with agitation—target about 88° F. (range of about 86 to about 90° F.);
3. Add the pre-made starter culture at 2%;
4. Hold 15 min with agitation;
5. Add rennet (0.01% of 2× Chymax, diluted in deionized water);
6. Hold 40 minutes with no agitation;
7. Cut curd and heal for 10 minutes—no agitation;
8. Slowly heat curd and whey to about 106° F. over about 20 min—with agitation;
9. Hold for 5 minutes with no heat and no agitation;
10. Pump curd and whey to drain table, stir and drain whey (curd pH 6.2-6.5);
11. Let stand for 5 minutes;
12. Pack cheese into individual packages/casings; and
13. Refrigerate the cheese.

The resulting cheese had a moisture content of about 48% and a pH of about 6.3. The queso fresco was then stored at 45° F. for six weeks, during which time the queso fresco was analyzed for bacterial growth, in particular *Listeria, Salmonella* and *E. Coli* at 45° F. and 55° F. Bacterial growth exceeding 1 log CFU/gram was considered a failed test.

TABLE 1

Bacterial Growth in Queso Fresco Control at 45° F.

| Interval (Day) | Listeria | Salmonella | E. Coli |
|---|---|---|---|
| 0 | —* | — | — |
| 1 | Pass | Pass | Pass |
| 3 | Pass | Pass | Pass |
| 5 | Fail | Pass | Pass |
| 7 | Fail | Pass | Fail |
| 10 | Fail | Pass | Fail |
| 14 | — | Pass | — |
| 21 | — | Pass | — |
| 24 | — | Pass | — |
| 28 | — | Pass | — |
| 35 | — | Pass | — |
| 42 | — | Pass | — |

* Indicates not tested.

TABLE 2

Bacterial Growth in Queso Fresco Control at 55° F.

| Interval (Day) | Listeria | Salmonella | E. Coli |
|---|---|---|---|
| 0 | —* | — | — |
| 1 | Pass | Pass | Pass |
| 3 | Fail | Fail | Fail |
| 5 | Fail | Fail | Fail |
| 42 | — | — | — |

*Indicates not tested.

Example 2

Queso Fresco with the Addition of Sorbic Acid, Nisin and Sea-i®

Queso fresco was prepared in the same manner as in Example 1. However, after step 10 wherein the whey is drained from the curd, a premixed antimicrobial blend was added to the curd. The antimicrobial blend included sorbic acid, Nisaplin and Sea-i®. Further, the blend included 7 parts Nisaplin, 5 parts sorbic acid and 6 parts Sea-i®. The blend was added to the curd, and the curd and blend were mixed for about 8-10 minutes to achieve a homogenous dispersion of the blend throughout the curd. In particular, the curd and blend combination included 0.07% Nisaplin, 0.05% sorbic acid and 0.06% Sea-i®. As with Example 1, the queso fresco was stored at both 45° F. and 55° F. for six weeks, during which time the queso fresco was analyzed for bacterial growth, in particular *Listeria, Salmonella* and *E. Coli* at 45° F. and 55° F. Bacterial growth exceeding 1 log CFU/gram was considered a failed test.

TABLE 3

Bacterial Growth in Queso Fresco with Antimicrobial Combination at 45° F.

| Interval (Day) | Listeria | Salmonella | E. Coli |
|---|---|---|---|
| 0 | * | * | * |
| 1 | Pass | Pass | Pass |
| 3 | Pass | Pass | Pass |
| 5 | Pass | Pass | Pass |
| 7 | Pass | Pass | Pass |
| 10 | Pass | Pass | Pass |
| 14 | Pass | Pass | Fail |

* Indicates not tested.

TABLE 4

Bacterial Growth in Queso Fresco with Antimicrobial Combination at 55° F.

| Interval (Day) | Listeria | Salmonella | E. Coli |
|---|---|---|---|
| 0 | * | * | * |
| 1 | Pass | Pass | Pass |
| 3 | Pass | Pass | Pass |
| 5 | Pass | Pass | Fail |
| 7 | Pass | Pass | Fail |
| 10 | Pass | Fail | * |
| 14 | Pass | Fail | * |

* Indicates not tested.

Example 3

Queso Freso with the Addition of Citric Acid, Sorbic Acid, Nisin and Sea-i®

Queso fresco was processed using the procedures of Example 2, but with the addition of citric acid. The relative amounts of sorbic acid, Nisaplin and Sea-i® remained the same as in Example 2. Further, the overall percentage of sorbic acid and Nisaplin in the curd/blend combination remained unchanged. The blend included 7 parts Nisaplin, 5 parts sorbic acid, 6 parts Sea-i® and 9 parts citric acid. The blend was added to the curd, and the curd and blend were mixed for about 8-10 minutes to achieve a homogenous dispersion of the blend throughout the curd. In particular, the curd and blend combination included 0.07% Nisaplin, 0.05% sorbic acid, 0.06% Sea-i® and 0.09% citric acid. As with Example 1, the queso fresco was stored at 45° F. for six weeks, during which time the queso fresco was analyzed for bacterial growth, in particular *Listeria, Salmonella* and *E. Coli* at 45° F. and 55° F. Bacterial growth exceeding 1 log CFU/gram was considered a failed test.

TABLE 5

Bacterial Growth in Queso Fresco with Antimicrobial Combination at 45° F.

| Interval (Day) | Listeria | Salmonella | E. Coli |
|---|---|---|---|
| 0 | * | * | * |
| 1 | Pass | Pass | Pass |
| 3 | Pass | Pass | Pass |
| 5 | Pass | Pass | Pass |

TABLE 5-continued

Bacterial Growth in Queso Fresco with
Antimicrobial Combination at 45° F.

| Interval (Day) | Listeria | Salmonella | E. Coli |
|---|---|---|---|
| 7 | Pass | Pass | Pass |
| 10 | Pass | Pass | Pass |
| 14 | Pass | Pass | |

* Indicates not tested.

TABLE 6

Bacterial Growth in Queso Fresco with
Antimicrobial Combination at 55° F.

| Interval (Day) | Listeria | Salmonella | E. Coli |
|---|---|---|---|
| 0 | * | * | * |
| 1 | Pass | Pass | Pass |
| 3 | Pass | Pass | Pass |
| 5 | Pass | Pass | Pass |
| 7 | Pass | Pass | Pass |
| 10 | Pass | Pass | Pass |
| 14 | Pass | Pass | Pass |

* Indicates not tested.

Example 4

Queso Fresco with the Addition of Citric Acid,
Sorbic Acid, Nisin, Sea-i® and an "Activated
Culture"

Queso fresco was processed using the procedures of Example 3, but an "activated culture" was added to the antimicrobial combination. In particular, the "activated culture" is a low acid, nisin producing culture as described in U.S. Patent Publication No. 2008/0152757. The relative amounts of each component of the blend included 7 parts Nisaplin, 5 parts sorbic acid, 6 parts Sea-i®, 9 parts citric acid and 1 part activated culture. Within the curd and blend combination, the Nisaplin comprised 0.07%, sorbic acid comprised 0.05%, Sea-i® comprised 0.06%, citric acid comprised 0.09% and the activated culture comprised 0.01%.

TABLE 7

Bacterial Growth in Queso Fresco with
Antimicrobial Combination at 45° F.

| Interval (Day) | Listeria | Salmonella | E. Coli |
|---|---|---|---|
| 0 | * | * | * |
| 1 | Pass | Pass | Pass |
| 3 | Pass | Pass | Pass |
| 5 | Pass | Pass | Pass |
| 7 | Pass | Pass | Pass |
| 10 | Pass | Pass | Pass |
| 14 | Pass | Pass | Pass |

* Indicates not tested.

TABLE 8

Bacterial Growth in Queso Fresco with
Antimicrobial Combination at 55° F.

| Interval (Day) | Listeria | Salmonella | E. Coli |
|---|---|---|---|
| 0 | * | * | * |
| 1 | Pass | Pass | Pass |
| 3 | Pass | Pass | Pass |
| 5 | Pass | Pass | Pass |
| 7 | Pass | Pass | Pass |
| 10 | Pass | Pass | Pass |
| 14 | Pass | Pass | Pass |

* Indicates not tested.

Example 5

Microbial Stability of Queso Fresco at Refrigeration Temperature

The microbial stability of the inventive cheese from Example 3 above was compared to the cheeses of Examples 2 and 4 under refrigeration conditions. Two pathogens capable of growing under refrigeration conditions were used. The psychrotrophic pathogens included both Gram-positive (*Listeria monocytogenes*) and Gram-negative bacteria (*Escherichia coli*).

The inventive cheese sample of Example 3 and the cheeses of Examples 2 and 4 were inoculated with *L. monocytogenes* and *E. coli* and were stored at 45° F. for a period of 5 weeks. The results of the growth of *L. monocytogenes* and *E. coli* in the cheeses at 45° F. are summarized in Tables 9 and 10 below.

TABLE 9

Average Growth of *L. monocytogenes* in Queso
Fresco cheese during storage at 45° F.

| Treatment | Time (days) | | | | |
|---|---|---|---|---|---|
| | 0 | 3 | 5 | 7 | 14 |
| Example 3 | 20 | 10 | <10 | <10 | <10 |
| Example 2 | <10 | <10 | <10 | <10 | <10 |
| Example 4 | <10 | <10 | <10 | <10 | <10 |

Values in the above table are reported in colony forming units (cfu) per gram of cheese.

The data shows that the blends of Examples 2, 3 and 4 effectively inhibited the growth of *Listeria monocytogenes* at refrigeration temperature.

TABLE 10

Growth of *E. coli* in Queso Fresco cheese during storage at 45° F.

| Treatment | Time (days) | | | | | | |
|---|---|---|---|---|---|---|---|
| | 0 | 3 | 5 | 7 | 14 | 21 | 28 | 35 |
| Example 2 | 56.7 | 10 | <10 | <10 | | <10 | <10 | <10 |
| Example 3 | 110 | <10 | 170 | <10 | <10 | | | <10 |
| Example 4 | <15 | <100 | <10 | <110 | <10 | <10 | | <10 |

Values in the above table are reported in colony forming units (cfu) per gram of cheese.

The data shows that the blends of Examples 2, 3 and 4 effectively inhibited the growth of *E. coli* at a refrigeration temperature of 45 degrees Fahrenheit.

Example 6

Microbial Stability of Queso Fresco at Abused Temperature

The microbial stability of the inventive cheese from Example 3 above was compared to the cheeses of Examples 2 and 4 at a slightly abused temperature (55° F.). The cheeses of Examples 2, 3 and 4 were inoculated with *L. monocytogenes* and *E. coli* and was stored at 55° F. for a period of 5 weeks. Samples were taken for *L. monocytogenes* and *E. coli* analysis periodically. The results are shown in Tables 11 and 12 below.

TABLE 11

Growth of *L. monocytogenes* in Queso Fresco cheese during storage at 55° F.

| Treatment | Time (days) | | | | | | | |
|---|---|---|---|---|---|---|---|---|
| | 0 | 3 | 5 | 7 | 14 | 21 | 28 | 35 |
| Example 2 | 20 | <10 | <10 | 1766.7 | 349066 | | | |
| Example 3 | <10 | <10 | <10 | <10 | | | 9050 | 165275 | 708000 |
| Example 4 | <10 | <10 | <10 | <10 | | <7285 | 5093 | <13030 |

Values in the above table are reported in colony forming units (cfu) per gram of cheese.

The data shows that the cheese of Example 2 supported a rapid growth of *L. monocytogenes* noticeable on day 7 while the cheeses of Examples 3 and 4 effectively inhibited the growth of *Listeria monocytogenes* at 55° F. at least through seven days.

TABLE 12

Growth of *E. coli* in Queso Fresco cheese during storage at 55° F.

| Treatment | Time (days) | | | | | | | |
|---|---|---|---|---|---|---|---|---|
| | 0 | 3 | 5 | 7 | 14 | 21 | 28 | 35 |
| Example 2 | 56.7 | 30 | 50 | 606.7 | 6240 | | | |
| Example 3 | 110 | 35 | <10 | <15 | <40 | <2600 | <3400 | <850 |
| Example 4 | <15 | <10 | <10 | <1 | <500 | <4800 | <10 | <130 |

Values in the above table are reported in colony forming units (cfu) per gram of cheese.

The data shows that the cheese of Example 2 supported a rapid growth of *E. coli* noticeable on day 7 while the cheeses of Examples 3 and 4 effectively inhibited the growth of *E. coli* at 55° F. at least through seven days.

Example 7

Sensory Evaluation of the Traditional Queso Fresco and Formulations of Examples 2, 3 and 4

A formal consumer evaluation was performed in areas with a relatively larger population of Mexican Americans. The products were evaluated in several categories including general rating, purchase intent, flavor, texture, melting and appearance. The assessment results are shown in Table 13.

TABLE 13

Consumer sensory evaluation scores of Queso Fresco cheese

| Category | Control (no antimicrobial) | Example 2 | Example 3 | Example 4 |
|---|---|---|---|---|
| General ratings: | | | | |
| Overall opinion of Appearance (9 pt.) | 7.23/7.86 | 7.61/7.77 | 7.42/7.82 | 7.53/7.82 |
| Overall opinion (9 pt.) | 7.08/7.57 | 7.19/7.17 | 7.24/7.56 | 7.27/7.20 |
| Expectation ("better or same" %) | 82/96 | 93/87 | 88/95 | 83/91 |
| Purchase intent (5 pt.) | 3.86/3.8 | 3.96/3.39 | 3.97/3.62 | 4.01/3.55 |
| Flavor: | | | | |
| Overall flavor liking (9 pt.) | 6.91/7.52 | 7.08/7.11 | 7.24/7.45 | 7.16/7.3 |
| Flavor strength ("just right" %) | 53/92 | 42/81 | 56/88 | 56/83 |
| Milky/dairy ("just right" %) | 52/95 | 55/85 | 55/87 | 49/89 |
| Saltiness ("just right" %) | 64/93 | 54/71 | 68/84 | 68/79 |
| Sourness ("just right" %) | 62/95 | 66/92 | 71/90 | 65/89 |
| After taste ("moderate" %) | 69/9 | 75/17 | 82/15 | 60/16 |
| Pleasantness after taste (%) | 77/86 | 86/47 | 86/71 | 77/86 |
| Texture/Melting: | | | | |
| Overall texture liking (9 pt.) | 7.09/7.58 | 7.23/6.98 | 7.19/7.43 | 7.14/7.41 |
| Crumbliness liking (9 pt.) | 7.22/7.59 | 7.17/7.05 | 7.36/7.55 | 7.25/7.34 |
| Melting liking (9 pt.) | 6.96/7.2 | 7.01/6.69 | 7.02/7.07 | 7.03/7.19 |
| Cutting liking (9 pt.) | 6.99/7.38 | 7.12/6.92 | 7.06/7.82 | 6.97/7.21 |

TABLE 13-continued

Consumer sensory evaluation scores of Queso Fresco cheese

| Category | Control (no antimicrobial) | Example 2 | Example 3 | Example 4 |
|---|---|---|---|---|
| Firmness as Cutting ("just right" %) | 31/86 | 24/74 | 7/79 | 28/83 |
| Creaminess ("just right" %) | 49/90 | 33/80 | 43/81 | 42/84 |
| Firmness ("just right" %) | 52/86 | 38/78 | 39/89 | 41/85 |
| Smoothness ("just right" %) | 55/85 | 38/85 | 50/83 | 47/87 |
| Moistness liking (9 pt.) | 60/90 | 48/83 | 49/82 | 50/86 |
| Appearance: | | | | |
| Overall appearance liking (9 pt.) | 7.1/7.67 | 7.22/7.36 | 7.39/7.55 | 7.38/7.54 |
| Color ("just right" %) | 69/95 | 70/95 | 60/96 | 62/92 |
| Moist appearance ("just right" %) | 59/94 | 55/80 | 50/83 | 59/94 |

The results are shown based on the scores from Los Angeles/Houston

The consumer evaluation results suggest that the cheese of Example 3 was at parity to the control (traditionally made base cheese without any inhibitors). The cheese of Example 3 did not significantly change the overall quality profiles of the cheese, nor impact consumer acceptance of the cheese. Further, the cheese of Example 3 provided superior ratings over the cheeses of Examples 2 and 4.

Example 8

Alternative Combinations Reviewed

Alternative combinations were prepared and reviewed for organoleptic qualities and bacterial growth, in particular *Listeria*, *Salmonella* and *E. coli*. Each combination was tested under two different temperature conditions: 45° F. and 55° F. Although some of the alternative combinations tested did inhibit bacterial growth over a long period of time after package opening, the organoleptic qualities of the combinations along with the bacterial resistance was unacceptable. In assessing the bacterial growth, the presence of a bacterium of 1 log CFU was considered a failed test.

TABLE 14

Combination of Nisaplin, Sorbic Acid, Sea-i ® and Pediocin at 45° F.

| Interval (Day) | *Listeria* | *Salmonella* | *E. Coli* |
|---|---|---|---|
| 0 | * | * | * |
| 1 | Pass | Pass | Pass |
| 3 | Pass | Pass | Pass |
| 5 | Pass | Pass | Pass |
| 7 | Pass | Pass | Pass |
| 10 | Pass | Pass | Pass |
| 14 | Pass | Pass | Fail |
| 21 | Pass | Pass | Fail |
| 24 | Pass | Pass | * |
| 28 | Pass | Pass | * |
| 35 | Pass | Pass | * |
| 42 | Pass | Pass | * |
| 49 | Pass | Pass | * |
| 56 | Pass | Pass | * |
| 70 | Pass | Pass | * |
| 84 | Pass | Pass | * |
| 98 | Pass | Pass | * |

* Indicates not tested.

TABLE 15

Combination of Nisaplin, Sorbic Acid, Sea-i ® and Pediocin at 55° F.

| Interval (Day) | *Listeria* | *Salmonella* | *E. Coli* |
|---|---|---|---|
| 0 | * | * | * |
| 1 | Pass | Pass | Pass |
| 3 | Pass | Pass | Pass |
| 5 | Pass | Pass | Pass |
| 7 | Pass | Pass | Fail |
| 10 | Pass | Fail | Fail |
| 14 | Pass | Fail | * |
| 21 | Pass | * | * |
| 24 | Fail | * | * |
| 28 | Fail | * | * |
| 35 | Fail | * | * |

* Indicates not tested.

TABLE 16

Combination of Nisaplin, Sorbic Acid, Sea-i ® and a Low Acid, Nisin Producing Culture at 45° F.

| Interval (Day) | *Listeria* | *Salmonella* | *E. Coli* |
|---|---|---|---|
| 0 | * | * | * |
| 1 | Pass | Pass | Pass |
| 3 | Pass | Pass | Pass |
| 5 | Pass | Pass | Pass |
| 7 | Pass | Pass | Pass |
| 10 | Pass | Pass | Pass |
| 14 | Pass | Pass | Pass |
| 21 | Pass | Pass | Pass |
| 24 | Pass | Pass | Pass |
| 28 | Pass | Pass | Pass |
| 35 | Pass | Pass | Pass |
| 42 | Pass | Pass | Pass |
| 49 | Pass | Pass | Pass |
| 56 | Pass | Pass | Pass |
| 70 | Pass | Pass | Pass |
| 84 | Pass | Pass | Pass |
| 98 | Pass | Pass | Pass |

* Indicates not tested.

TABLE 17

Combination of Nisaplin, Sorbic Acid, Sea-i ® and a Low Acid, Nisin Producing Culture at 55° F.

| Interval (Day) | *Listeria* | *Salmonella* | *E. Coli* |
|---|---|---|---|
| 0 | * | * | * |
| 1 | Pass | Pass | Pass |
| 3 | Pass | Pass | Pass |

TABLE 17-continued

Combination of Nisaplin, Sorbic Acid, Sea-i ® and a
Low Acid, Nisin Producing Culture at 55° F.

| Interval (Day) | Listeria | Salmonella | E. Coli |
|---|---|---|---|
| 5 | Pass | Pass | Pass |
| 7 | Pass | Pass | Pass |
| 10 | Pass | Pass | Pass |
| 14 | Pass | Pass | Pass |
| 21 | Pass | Pass | Pass |
| 24 | Pass | Pass | Pass |
| 28 | Pass | Pass | Pass |
| 35 | Pass | Pass | Pass |
| 42 | Pass | Pass | Pass |
| 49 | Pass | Pass | Pass |
| 56 | Pass | Pass | Pass |
| 70 | Pass | Pass | Pass |
| 84 | Pass | Pass | Pass |
| 98 | Pass | Pass | Pass |

* Indicates not tested.

TABLE 18

Combination of Nisaplin, Sorbic Acid, Sea-i ® and
AM1079 at 45° F.

| Interval (Day) | Listeria | Salmonella | E. Coli |
|---|---|---|---|
| 0 | * | * | * |
| 1 | Pass | Pass | Pass |
| 3 | Pass | Pass | Pass |
| 5 | Pass | Pass | Pass |
| 7 | Pass | Pass | Pass |
| 10 | Pass | Pass | Pass |
| 14 | Pass | Pass | Pass |
| 21 | Pass | Pass | Pass |
| 24 | Pass | Pass | Pass |
| 28 | Pass | Pass | Pass |
| 35 | Pass | Pass | Pass |
| 42 | Pass | Pass | Pass |
| 49 | Pass | Pass | Pass |
| 56 | Pass | Pass | Pass |
| 70 | Pass | Pass | Pass |
| 84 | Pass | Pass | Pass |
| 98 | Pass | Pass | Pass |

* Indicates not tested.

TABLE 19

Combination of Nisaplin, Sorbic Acid, Sea-i ® and
AM1079 at 55° F.

| Interval (Day) | Listeria | Salmonella | E. Coli |
|---|---|---|---|
| 0 | * | * | * |
| 1 | Pass | Pass | Pass |
| 3 | Pass | Pass | Pass |
| 5 | Pass | Pass | Pass |
| 7 | Pass | Pass | Pass |
| 10 | Pass | Pass | Pass |
| 14 | Pass | Pass | Pass |
| 21 | Pass | Pass | Pass |
| 24 | Pass | Pass | Pass |
| 28 | Pass | Pass | Pass |
| 35 | Pass | Pass | Pass |
| 42 | Pass | Pass | Pass |
| 49 | Pass | Pass | Pass |
| 56 | Pass | Pass | Pass |
| 70 | Pass | Pass | Pass |
| 84 | Pass | Pass | Pass |
| 98 | Pass | Pass | Pass |

* Indicates not tested.

All references (including publications, patents, patent publications, and patent applications) cited herein are incorporated by reference. All percentages throughout this specification are by weight percent unless otherwise specified.

What is claimed is:

1. A preserved high moisture cheese composition comprising:
    cheese having at least about 40 weight percent moisture;
    a preservative blend comprising at least one organic food preserving acid or its food grade acceptable water soluble salt, nisin, and at least one enzyme which inhibits gram positive bacteria, gram negative bacteria, yeasts and molds,
    the preservative blend of organic preserving acid, nisin component and enzyme being in an amount and the ingredients of the preserving blend being in relative amounts to provide the preserved cheese composition which will have less than 1 log cfu/g of pathogenic gram positive and gram negative bacteria for at least about 7 days when stored at 55° F. immediately after production of the preserved cheese composition.

2. The preserved cheese composition of claim 1 wherein the pathogenic bacteria are Listeria monocytogenes, Salmonella, E. coli, and Clostridium botulinum.

3. The preserved cheese composition of claim 1 wherein the preservative blend includes citric acid or the water soluble salt of citric acid and sorbic acid or the water soluble salt of sorbic acid.

4. The preserved cheese composition of claim 3, wherein the cheese is queso fresco.

5. The preserved cheese composition of claim 3, wherein the cheese is selected from the group consisting of ricotta, mozzarella and cottage cheese.

6. The preserved cheese composition of claim 1, wherein the preservative blend includes about 900 parts by weight, based upon the weight of the blend, citric acid or the water soluble salt of citric acid and 500 parts by weight, based upon the weight of the blend, sorbic acid or the water soluble salt of sorbic acid, 210 parts by weight, based upon the weight of the blend, nisin, and 12 parts by weight, based upon the weight of the blend, enzyme.

7. The preserved cheese composition of claim 1, wherein sorbic acid or its water soluble salt comprises about 0.1 weight percent, based upon the dry solids of a cheese curd which is a precursor of the cheese, citric acid or its water soluble salt comprises about 0.18 weight percent, based upon dry solids of the cheese curd, nisin comprises about 0.0042 weight percent, based upon dry solids of the cheese curd, and enzyme comprises about 0.00024 weight percent, based upon the dry solids of the cheese curd.

8. A method for preserving a high moisture cheese product, the method comprising:
    blending a curd precursor of the high moisture cheese and a preservative blend comprising at least one organic food preserving acid or its food grade acceptable water soluble salt, nisin, and at least one enzyme which inhibits gram positive bacteria, gram negative bacteria, yeasts and molds, to provide a high moisture preserved cheese product having at least 40 weight percent moisture; and
    aseptically packaging the high moisture preserved cheese product,
    the preservative blend of organic preserving acid, nisin and enzymes being in an amount and the ingredients of the preserving blend being in relative amounts effective to provide the preserved cheese product with less than 1 log cfu/g of pathogenic gram positive and gram negative bacteria when stored for at least about 7 days at 55° F. after opening the aseptically packaged preserved cheese product.

9. The method of claim 8 wherein the pathogenic bacteria are Listeria monocytogenes Salmonella, E. coli, and Clostridium botulinum.

10. The method of claim 8 wherein the preservative blend includes citric acid or the water soluble salt of citric acid and sorbic acid or the water soluble salt of sorbic acid.

11. The method of claim 10 wherein the cheese is queso fresco.

12. The method of claim 10 wherein the cheese is selected from the group consisting of ricotta, mozzarella and cottage cheese.

13. The method of claim 8, wherein the preservative blend includes about 900 parts by weight, based upon the weight of the blend, citric acid or the water soluble salt of citric acid and 500 parts by weight, based upon the weight of the blend, sorbic acid or the water soluble salt of sorbic acid, 210 parts by weight, based upon the weight of the blend, nisin, and 12 parts by weight, based upon the weight of the blend, enzyme.

14. The method of claim 8, wherein sorbic acid or its water soluble salt comprises about 0.1 weight percent, based upon the dry solids of a cheese curd which is a precursor of the cheese, citric acid or its water soluble salt comprises about 0.18 weight percent, based upon dry solids of the cheese curd, nisin comprises about 0.0042 weight percent, based upon dry solids of the cheese curd, and enzyme comprises about 0.00024 weight percent, based upon the dry solids of the cheese curd.

* * * * *